US006752316B2

(12) United States Patent
Mizoguchi

(10) Patent No.: US 6,752,316 B2
(45) Date of Patent: Jun. 22, 2004

(54) TWO-DIMENSIONAL CODE

(76) Inventor: Satoshi Mizoguchi, 402, Dia-Palace Shonan Hills Ninomiya, 2-21-32 Nakazato, Ninomiya-machi, Naka-gun, Kanagawa-prefecture (JP)

(*) Notice: Subject to any disclaimer, the term of this patent is extended or adjusted under 35 U.S.C. 154(b) by 0 days.

(21) Appl. No.: 10/212,218

(22) Filed: Aug. 6, 2002

(65) Prior Publication Data

US 2003/0029923 A1 Feb. 13, 2003

(30) Foreign Application Priority Data

Aug. 9, 2001 (JP) ...................................... 2001-275740

(51) Int. Cl.[7] ................................................ G06K 7/10

(52) U.S. Cl. ............ 235/462.09; 235/494; 235/462.25; 235/462.1; 235/462.07

(58) Field of Search ........................... 235/462.09, 494, 235/462.25, 462.01, 462.07, 462.1

(56) References Cited

U.S. PATENT DOCUMENTS 5,128,525 A * 7/1992 Stearns et al. .............. 235/454
5,241,166 A * 8/1993 Chandler .................... 235/494
5,477,045 A * 12/1995 Priddy et al. ............... 235/494
5,521,372 A * 5/1996 Hecht et al. ................ 235/494
5,726,435 A * 3/1998 Hara et al. .................. 235/494
5,825,015 A * 10/1998 Chan .......................... 235/494
6,000,614 A * 12/1999 Yang et al. ................. 235/460
6,076,738 A * 6/2000 Bloomberg et al. ......... 235/494
6,095,422 A * 8/2000 Ogami ................. 235/462.27
6,164,552 A * 12/2000 Sato ........................... 235/494
6,267,296 B1 * 7/2001 Ooshima et al. ............ 235/487
6,360,948 B1 * 3/2002 Yang et al. .............. 235/462.1
6,429,951 B1 * 8/2002 Kiuchi et al. ................ 358/1.9
6,456,798 B1 * 9/2002 Keech et al. ............... 396/311
6,530,523 B1 * 3/2003 Oakeson et al. ....... 235/462.01
6,565,003 B1 * 5/2003 Ma ......................... 235/462.1
6,612,497 B1 * 9/2003 Iida et al. .............. 235/462.25
2002/0153423 A1 * 10/2002 Schramm .................... 235/487
2003/0047612 A1 * 3/2003 Shaked et al. ........... 235/462.1

* cited by examiner

*Primary Examiner*—Jared J. Fureman
*Assistant Examiner*—Allyson N. Trail
(74) *Attorney, Agent, or Firm*—Lorusso, Loud & Kelly

(57) ABSTRACT

A two-dimensional code for recognizing data in high speed and recording large amount of data in a limited space. The two-dimensional code was designed by locating one solid line that covers four corners of the area for matrix data element in order to obtain information of physical size of the two-dimensional code easily, and by arranging capture lines on the solid line to make a structure to obtain data density for capturing the two-dimensional code by high resolution CCD(Charged Coupled Devices) image scanner, and it can be presented that can store large amount of data in a limited size and generation of code with high density becomes possible.

6 Claims, 3 Drawing Sheets

TWO-DIMENSIONAL CODE

BACKGROUND OF THE INVENTION

1. Field of the Invention

This invention relates to two-dimensional code, which is designed based on the specifications of high resolution CCD(Charged Coupled Device) scanning unit to achieve high density data storage and improving rate of recognition.

2. Description of the Prior Art

Various two-dimensional codes have been developed. One known two-dimensional code is to form of a matrix containing data having a first side and a second side each being formed of identical broken line patterns, and a third side and a fourth side are each formed as a solid line of equal darkness intersecting at a second corner. The solid lines correspond to the length, height and area of the code. At this two-dimensional code, the matrix data elements were divided into multiple parts to build up in two-dimensional array for error correction as disclosed in Japanese Patent Laid-Open Publication No. 168902/1995.

Another known two-dimensional code is to use special shape of timing cell as the image capture devise which should be embedding in a matrix data elements for obtaining quick response of image by CCD(Charged Coupled Device) scanner, disclosed in Japanese Patent Laid-Open Publication No. 254037/1995.

The above-mentioned trials were found to be useful to capture the image of two-dimensional code by the CCD scanning equipments with low-resolution specification such as 380,000 pixels which to be used for reading conventional one-dimensional bar code. The main concentration of designing those two-dimensional code were how to retrieve physical size and position of two-dimensional code, and importance of storing and recording of large amount of data elements into a restricted area was not considered due to low performance in resolution of CCD scanner.

However, these trials premised on low performance in resolution of CCD scanner are now blocking to store high density matrix data elements in limited space, because of their structure of timing cells which have to be embedded in the matrix data elements area for obtaining quick response of two-dimensional code image. Therefore, processing area of two-dimensional code has become larger in size according to ratio of information amount when trying to store large amount of data element.

Owing to recent technical innovation, especially remarkable development of high-resolution CCD digital cameras and high performance DSP (Digital Signal Processor), environment has been consolidated to store large amount of information with high density in a restricted area. By adopting current high technology achievement, it became possible to capture the data of two-dimensional code in high speed by the current high resolution CCD image scanner and DSP without using special timing cells or multiple array matrix data arrangement.

This invention is proposed considering the above mentioned innovation of technology and, a new type of two-dimensional code is designed that is able to obtain higher speed of reading and higher density of information.

SUMMARY OF THE INVENTION

This invention is designed to solve the above-mentioned problems by following means.

By this invention, it is composed of matrix data elements area where the binary data are encoded to a two-dimensional code and a continuous solid line to cover four corners and center part of the matrix data elements area, and this two-dimensional code is provided with a pattern to give information of both data density of the above matrix data elements and physical size, and the above pattern, applied with a solid line to adjacent of an area of matrix data elements, is arranged to pass four corner points from upper side to two corner points of bottom side going through the center point of right and left side such as the line in alphanumeric Z shape or S shape.

The solid line that reaches to the fourth corner, and the final part of the solid line is further extended to the same length of capture line(projection part). Thus only the fourth corner point is projected toward outside as per a register mark of commercial printing, which can be selected as the datum point to specify position coordinate within reading image.

On a solid line of the above pattern, capture lines (projection part) at a fixed pitch are allocated as outward extension of solid line, however no capture lines locates on the solid line that crosses the area of matrix data elements. Since the capture lines are allocated based on the volume of storage information, density information of the data can be judged by calculating amount of capture lines that are located by a fixed pitch on a solid line. By this way, information of data density of matrix data element area can be obtained.

Owing to this invention, physical size of code can be specified by a solid line which covers all four corner points of matrix data element area, and by allocating the above pattern that provides information of data density on a solid line, physical size and density information of two-dimensional code can be identified by a single pattern. Therefore improvement of reading speed of this two-dimensional code is realized, and this two-dimensional code can be presented that can contain large amount of information into higher density.

DESCRIPTION OF THE PREFFERED EMBODIMENTS

Figure 1:
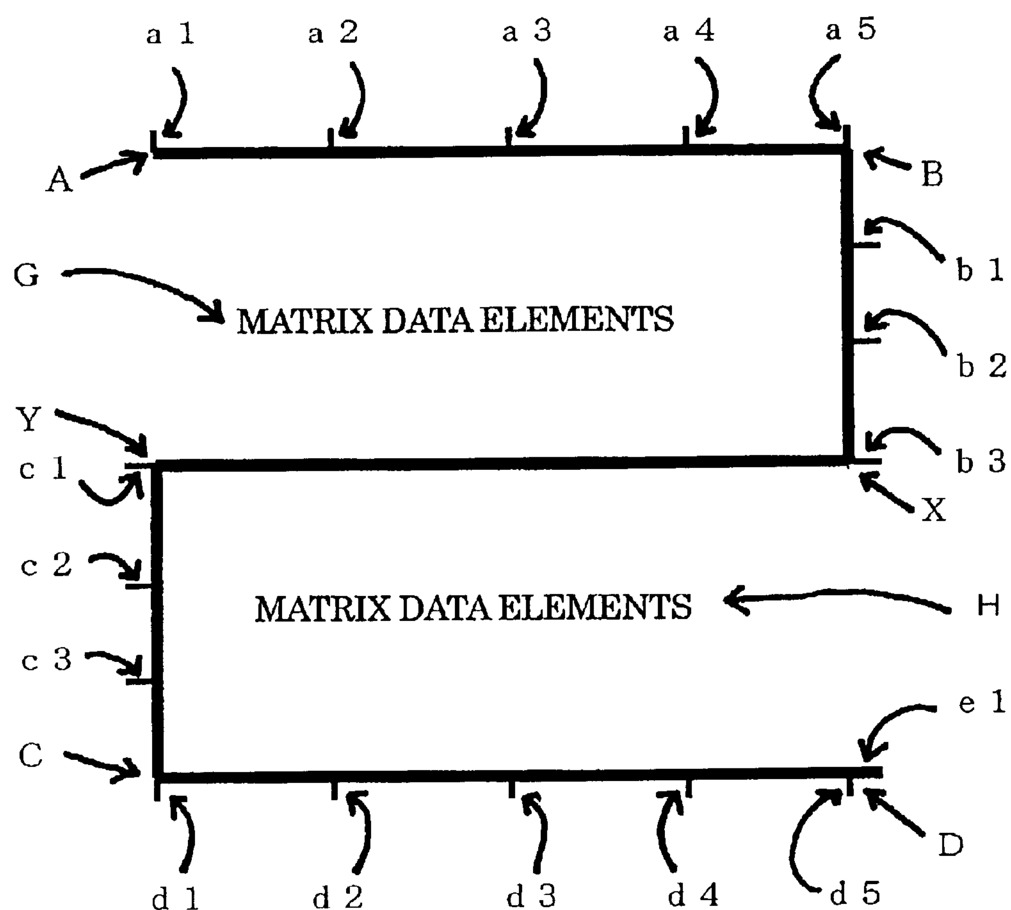
FIG. 1 is a rough sketch of a form of execution of the two-dimensional code related with this invention.

To explain a form of execution of two-dimensional code provided by this invention by referring attached FIG. 1.

FIG. 1 is a rough sketch of the form of two-dimensional code of this invention. This invention relates to an optically readable two-dimensional code, including a matrix data elements area, which identifies encoded information, and an information of physical size and density of the code.

The present invention is, as shown in FIG. 1, executing form of two-dimensional code provides G and H that are areas of matrix data elements to identify encoded information, and solid line 1 that connects four corner points A to D on the area of G and H matrix data elements, and capture lines(projection part) a1–a5, b1–b3, c1–c3, d1–d5 and e1 allocated on solid line 1 in extension that identifies the density of a two-dimensional code.

Solid line 1 is arranged in adjacent with the area G and H of matrix data element in alphanumeric Z shape, which is parallel from A to B, and vertical from B to middle point X on right side, and crossing area G and H of data matrix element in parallel from middle point X on right side to middle point Y on left side, and vertical from middle point Y to left corner point C on bottom side, and extending from let corner point C to left corner point D on bottom side.

Namely, the two-dimensional code identify physical size of code means comprises an upper side aspect right corner point B drawn from an upper side aspect left corner point A of matrix data elements area G, a right side aspect middle point X drawn from the upper side aspect right corner point B, a left side aspect middle point Y which crosses data element area G and H horizontally drawn from right side aspect middle point X, an bottom side aspect left corner point C drawn from left side aspect middle point Y, an bottom side aspect right corner point D drawn from bottom side aspect left corner point C, and one solid line 1 in alphanumeric Z shape drawn by passing through each of the points.

Solid line 1 is extended to the length of capture line at the final corner point D of matrix data element area H. This extended line e1 is utilized as an Datum point(starting part) to specify orientation of the code for coordination of image processing.

Capture lines(projection part) a1–a5, b1–b3, c1–c3 and d1–d5 are allocated on the solid 1 adjacent matrix data elements area G and H, except a solid line crossing said matrix data elements area G and H, with a fixed pitch locating outside in extension. Capture line (projection part) d5 is crossing with e1 which is an extended line of solid line 1 as mentioned above and makes a projected shape extending toward outside as per a register mark of commercial printing, to be utilized as the datum point(starting point) of the two-dimensional code on the point of image processing. However, the number of capture line(projection part) can be increased and decreased according to amount of data in the area of matrix data element G and H.

The two-dimensional code read means uses a CCD area sensor as a sensor and performs processing in the order of

- binarizing analog image information output from the CCD area sensor,
- detecting two-dimensional code from binarized image data, and,
- extracting cell data of the detected two-dimensional code.

The binarization method is to convert an analog image signal output from the CCD area sensor into digital form, storing a screen image signal in an image memory. At this stage, shading correction and binarization processing are executed for all image information.

After the binarization is executed, two-dimensional code is detected. To detect two-dimensional code is to detect the position and physical size of the two-dimensional code. Several methods for detection of code have been tried as mentioned above "Background of the Invention".

This invention identifies physical size and density of a two-dimensional code means utilizes one single solid line 1 to draw adjacent matrix data elements area G and H for covering all four corners of matrix data elements area G and H, so that line detection can be executed without receiving the effect of a flaw. Once the pattern of this solid line is memorized in the microprocessor of reading device, the detection of code can be processed without taking long processing time.

After the two-dimensional code is detected, the position of the datum point(starting point) of the two-dimensional code is found and binary data can be extracted. As described above, capture line (projection part) d5 is crossing with e1 which is an extended line of solid line 1 and makes a projected shape extending toward outside as per a register mark of commercial printing, to be utilized as the datum point(starting point) of the two-dimensional code on the point of image processing.

Since all corner points A, B, C and D of matrix data elements area G and H are covered by one solid line 1 to execute line detection, the computation amount decrease and it does not takes processing time.

Figure 2:
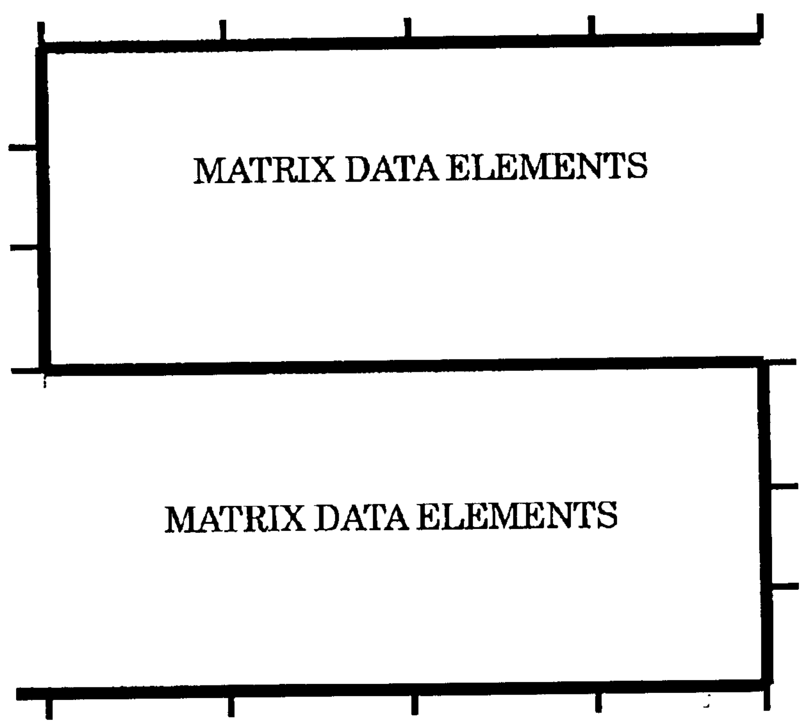
FIG. 2 is a form of the two-dimensional code related with this invention.

In above-mentioned two-dimensional code, a solid line 1 is allocated in alphanumeric Z shape. As described in FIG. 2, the same result can be obtained by the two-dimensional code comprising, to identify physical size of the code by drawing one solid line in S shape of alphanumeric from right corner point of upper side of data element area to its left corner point of upper side, from left corner point of bottom side to middle point of left side, from middle point of left side to middle point of right side which crosses data element area horizontally, from right corner point of bottom side, and from right corner point of bottom side to left corner point of bottom side.

Thus this two-dimensional code at the above execution form makes it possible to generate symbols with high density because solid line 1 is located to cover all of four corner points A–D of the area of matrix data elements area G and H, by which ratio to recognize the two-dimensional code is improved and there is no need to inlay with many starting symbols of the code which can generate codes with high density, and the two-dimensional code can be presented that enables to contain as many data as possible in less and small area.

Figure 3:
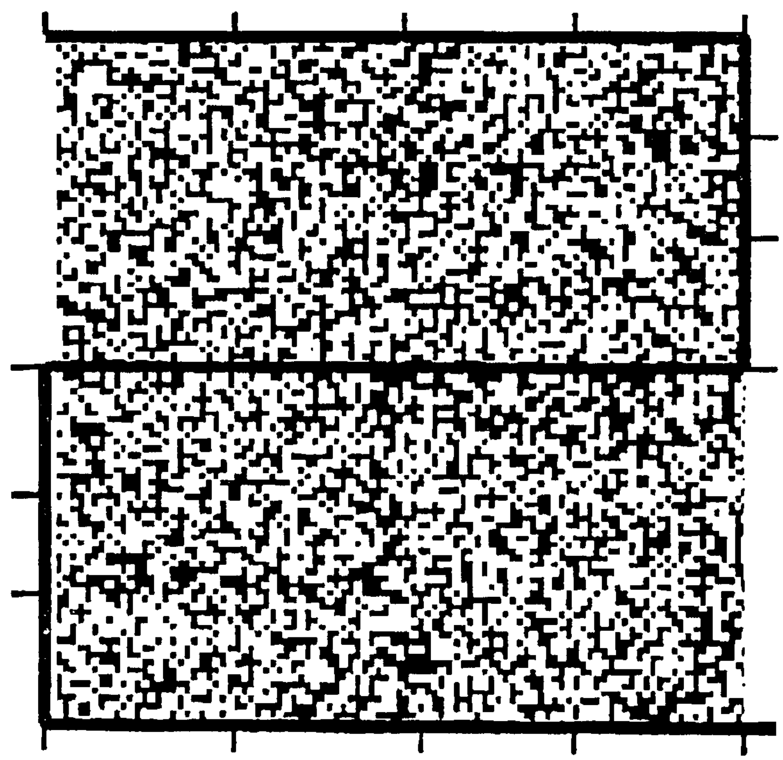
FIG. 3 is a form of examples to execute designing of the two-dimensional code related with this invention.

FIG. 3 shows concrete image of the two-dimensional code identifying physical size.

As described above, a solid line is arranged to cover all four corner points of matrix data elements area of this invention, and consequently physical code size can be identified easily. Also, by constituting a structure to obtain data density with capture lines arranged on the solid line, it is possible to generate a high density code which results to present a new two-dimensional code with high density data information stored in less and small area.

What is claimed is:

1. An optically readable two-dimensional code, including a matrix data elements area which contains encoded information, and information identifying physical size and density of the code, said two-dimensional code information which identifies the physical size comprising:

- a first line drawn from an upper side aspect left corner point of said matrix data elements area to an upper side aspect right corner point,
- a second line drawn from said upper side aspect right corner point to a right side aspect middle point,
- a third line which crosses said data element area horizontally and is drawn from said right side aspect middle point to a left side aspect middle point,
- a fourth line drawn from said left side aspect middle point to a bottom side aspect left corner point, and
- a fifth line drawn from said bottom side aspect left corner point to a bottom side aspect right corner point,
- said first, second, third fourth and fifth lines forming one solid line in alphanumeric Z-shape to be scanned and utilized for determining said matrix data elements area.

2. A two-dimensional code according to claim 1, wherein said two-dimensional code information which identifies density comprising:

capture lines with a fixed pitch located outside of said first, second, fourth and fifth lines in extension.

3. A two-dimensional code according to claim 1, further comprising a datum point to specify orientation of the code when reading an image of the two-dimensional code, said datum point extending a final point of solid line one of said first and fifth lines.

4. An optically readable two-dimensional code, including a matrix data elements area which contains encoded information, and information identifying physical size and density of the code, said two-dimensional code information which identifies the physical size comprising:

a first line drawn from an upper side aspect right corner point of said matrix data elements area to an upper side aspect left corner point, a second line drawn from said upper side aspect left corner point to a left side aspect middle point, a third line which crosses said data element area horizontally and is drawn from said left side aspect middle point to a right side aspect middle point, a fourth line drawn from said right side aspect middle point to a bottom side aspect right corner point, and a fifth line drawn from said bottom side aspect right corner point to a bottom side aspect right corner point, said first, second, third, fourth and fifth lines forming one solid line in alphanumeric S-shape to be scanned and utilized for determining said matrix data elements area.

5. A two-dimensional code according to claim 4, wherein said two-dimensional code information which identifies density comprising:

capture lines with a fixed pitch located outside of said first, second, fourth and fifth lines in extension.

6. A two-dimensional code according to claim 4, further comprising a datum point to specific orientation of the code when reading an image of the two-dimensional code, said datum point extending a final point of one of said first and fifth lines.

* * * * *